United States Patent
Canal Vila et al.

(10) Patent No.: US 12,071,924 B2
(45) Date of Patent: Aug. 27, 2024

(54) DEVICES AND METHODS FOR MITIGATING VIBRATIONS IN WIND TURBINES

(71) Applicant: General Electric Renovables Espana, S.L., Barcelona (ES)

(72) Inventors: Marc Canal Vila, Barcelona (ES); Darren John Danielsen, Greenville, SC (US); Rolf Hansen, Esbjerg (DK); Jesper Madsen, Gesten (DK)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/959,440

(22) Filed: Oct. 4, 2022

(65) Prior Publication Data
US 2023/0108569 A1    Apr. 6, 2023

(30) Foreign Application Priority Data
Oct. 4, 2021  (EP) ..................................... 21382890

(51) Int. Cl.
*F03D 1/06* (2006.01)
(52) U.S. Cl.
CPC ........ *F03D 1/0675* (2013.01); *F05D 2260/96* (2013.01)
(58) Field of Classification Search
CPC ...... F03D 1/0675; F03D 80/50; F03D 80/502; F05B 2230/80; F05B 2260/96
See application file for complete search history.

(56) References Cited

U.S. PATENT DOCUMENTS

| | | | | |
|---|---|---|---|---|
| 8,851,211 | B2 * | 10/2014 | Schlee | F03D 80/50 |
| | | | | 280/412 |
| 9,316,202 | B2 * | 4/2016 | Bech | F03D 80/00 |

(Continued)

FOREIGN PATENT DOCUMENTS

| | | |
|---|---|---|
| CA | 3092485 A1 | 3/2021 |
| DK | 179394 B1 | 5/2018 |

(Continued)

OTHER PUBLICATIONS

European Search Report Corresponding to EP21382890 on Mar. 16, 2022.

(Continued)

*Primary Examiner* — Sang K Kim
(74) *Attorney, Agent, or Firm* — Dority & Manning, P.A.

(57) ABSTRACT

The present disclosure relates to devices (300) for wind turbine blades (22) and methods for reducing vibrations in wind turbines (10). More particularly, the present disclosure relates to devices (300) for mitigating vortex induced vibrations and stall induced vibrations, wind turbine blades (22) comprising such devices (300), and methods for reducing wind turbine vibrations when the wind turbine (10) is parked, especially during wind turbine installation and/or maintenance. A device (300) comprises a proximal support (310) configured to be arranged around a first portion (221) of a wind turbine blade (22), a distal support (320) configured to be arranged around a second portion (222) of the wind turbine blade (22), and a barrier (330) extending between the proximal support (310) and the distal support (320). The first portion (221) of the wind turbine blade (22) is at a different longitudinal position along the blade (22) than the second portion (222). The proximal (310) and distal (320) supports are configured to provide a gap (350) between the barrier (330) and a wind turbine blade surface.

14 Claims, 10 Drawing Sheets

(56) References Cited

U.S. PATENT DOCUMENTS

| | | | |
|---|---|---|---|
| 10,288,039 B2* | 5/2019 | Chen | F03D 80/50 |
| 10,337,540 B2 | 7/2019 | Wardropper et al. | |
| 10,704,288 B2* | 7/2020 | Fletcher | B23P 6/002 |
| 11,384,739 B2* | 7/2022 | Sahni | F03D 80/50 |
| 2010/0135814 A1* | 6/2010 | Bakhuis | F03D 1/0633 |
| | | | 416/223 R |
| 2012/0301293 A1 | 11/2012 | Bech | |
| 2015/0219070 A1 | 8/2015 | Gil Molla | |
| 2017/0002797 A1 | 1/2017 | Chen et al. | |
| 2017/0030327 A1* | 2/2017 | Fletcher | F03D 80/50 |
| 2017/0370386 A1* | 12/2017 | Wardropper | F03D 80/00 |
| 2018/0171975 A1 | 6/2018 | Rohm | |
| 2020/0116128 A1 | 4/2020 | Pedersen et al. | |
| 2021/0079896 A1 | 3/2021 | Herrig et al. | |

FOREIGN PATENT DOCUMENTS

| | | |
|---|---|---|
| EP | 2565440 A2 | 3/2013 |
| EP | 3112667 A1 | 1/2017 |
| EP | 3795824 A1 | 3/2021 |
| GB | 2475865 A | 6/2011 |
| WO | WO2011067304 A1 | 6/2011 |
| WO | WO2016107624 A1 | 7/2016 |
| WO | WO2019015731 A1 | 1/2019 |

OTHER PUBLICATIONS

Lee, Airfoil Vortex Induced Vibration Suppression Devices, Thesis B.S. Naval Architecture and Marine Engineering, Massachusetts Institute of Technology Department of Mechanical Engineering, May 2007, 84 Pages. https://dspace.mit.edu/handle/1721.1/39874.

* cited by examiner

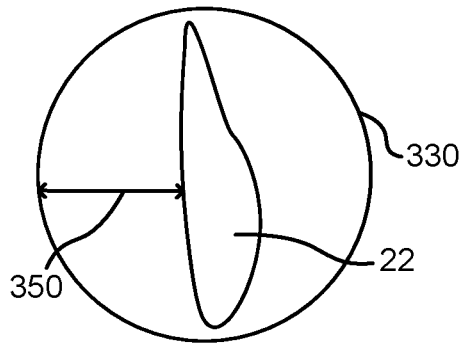
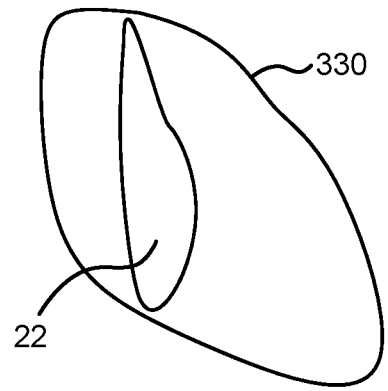
Fig. 6A
Fig. 6B
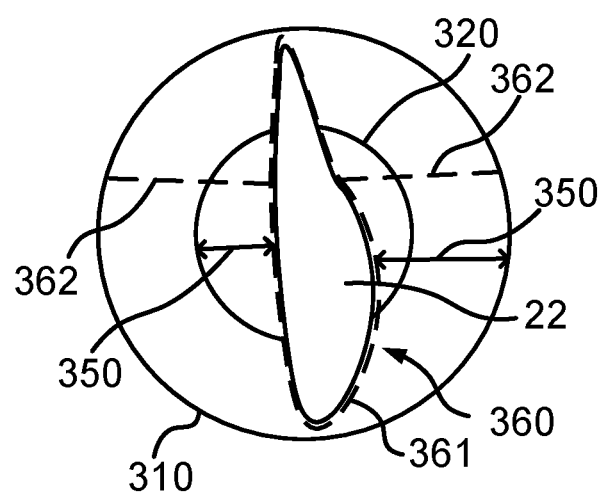
Fig. 7

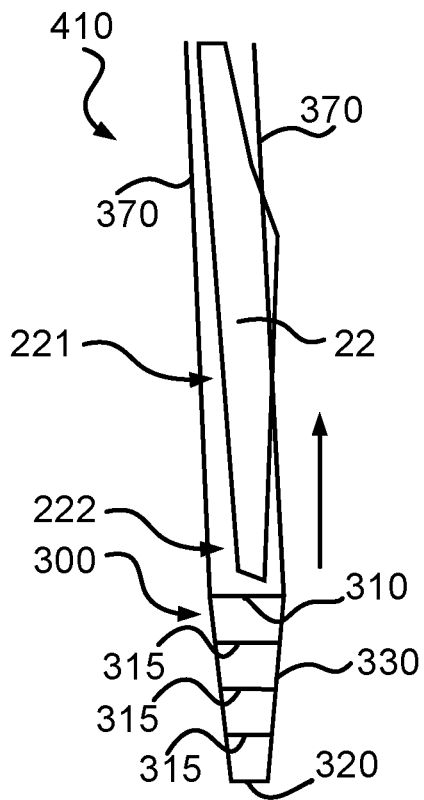
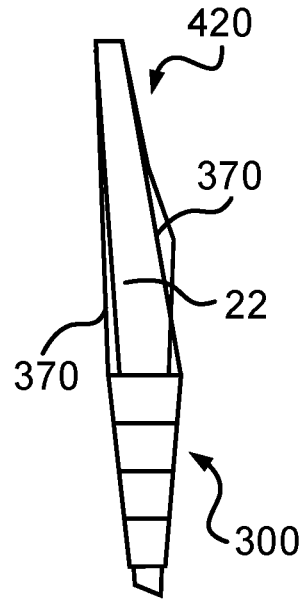
Fig. 9A
Fig. 9B
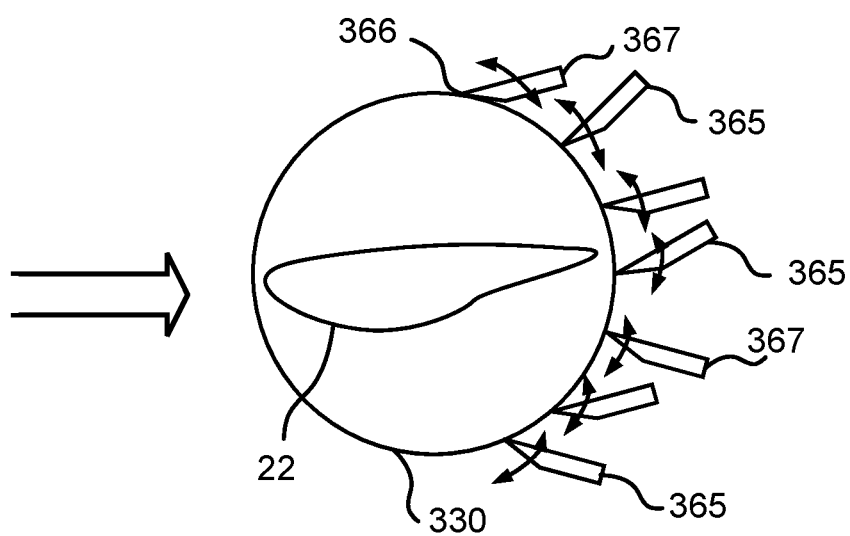
Fig. 10

DEVICES AND METHODS FOR MITIGATING VIBRATIONS IN WIND TURBINES

The present disclosure relates to devices for wind turbine blades and methods for reducing vibrations in wind turbines. More particularly, the present disclosure relates to devices for mitigating vortex induced vibrations and stall induced vibrations, wind turbine blades comprising such devices, and methods for reducing wind turbine vibrations when the wind turbine is parked, especially during wind turbine installation and/or maintenance.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly ("directly driven" or "gearless") or through the use of a gearbox. This way, the generator produces electricity which can be supplied to the electrical grid.

The wind turbine hub may be rotatably coupled to a front of the nacelle. The wind turbine hub may be connected to a rotor shaft, and the rotor shaft may then be rotatably mounted in the nacelle using one or more rotor shaft bearings arranged in a frame inside the nacelle. The nacelle is a housing arranged on top of a wind turbine tower that may contain and protect the gearbox (if present) and the generator (if not placed outside the nacelle) and, depending on the wind turbine, further components such as a power converter, and auxiliary systems.

There is a trend to make wind turbine blades increasingly longer to capture more wind and convert the energy of the wind into electricity. This makes blades more flexible and more prone to vibrations of the blades. Wind turbine blades vibrating excessively may get damaged. Vibrations of the rotor blades may also result in the whole wind turbine structure oscillating e.g. fore-aft oscillations, or sideways oscillations. Vibrations in the wind turbine blade may also damage other components of the wind turbine due to excessive stress.

When the wind turbine is in operation (i.e. producing energy and connected to an electrical grid), a wind turbine controller may operate auxiliary drive systems such as a pitch system or a yaw system to reduce or change loads on the blades. This way, vibrations of the blades may be counteracted. However, the problem of vibrations can be serious as well in circumstances when the wind turbine is parked and disconnected from the grid.

When a wind turbine is parked, the wind may blow against the wind turbine from unusual directions, i.e. different from when in normal operation. The airflow around the wind turbine may cause the wind turbine to vibrate. Vibrations may stress and even damage one or more wind turbine components, which may compromise the performance of the wind turbine, increase the need of repairs and reduce the lifespan of the wind turbine. As an orientation of a wind turbine blade cannot be adapted to the direction of the incoming wind, e.g. through yawing and/or pitching as opposed to when the wind turbine is operating, the effects of vibrations may be greater or different when the wind turbine is parked than when the wind turbine is operating normally and producing energy.

In particular, this may apply when the wind turbine is being installed or commissioned. For example, it may happen that an incomplete rotor is installed (e.g. a rotor having a single blade or two blades out of the total of three blades). The remaining blades may not be installed until a few days or a week later. In the meantime, the partially installed (or "incomplete") rotor may be in standstill. The rotor may or may not be locked, and the wind turbine can be exposed to varying wind conditions. This may likewise apply if the wind turbine is stopped during several hours, days or weeks, e.g. for maintenance reasons. A wind turbine blade can start to vibrate in any of these conditions depending particularly on the direction of the wind.

SUMMARY

In an aspect of the present disclosure, a device for mitigating vibrations of a parked wind turbine is provided. The device comprises a proximal support configured to be arranged around a first portion of a wind turbine blade, a distal support configured to be arranged around a second portion of the wind turbine blade, and a barrier extending between the proximal support and the distal support. The first portion of the wind turbine blade is at a different longitudinal position along the blade than the second portion of the wind turbine blade. The proximal and distal supports are configured to provide a gap between the barrier of the device and a wind turbine blade surface.

According to this aspect, a device sized and shaped for surrounding a wind turbine blade and providing an empty space between the barrier of the device and a wind turbine blade surface when arranged around the blade is provided. The proximal and distal supports confer certain stiffness to the device and allow to keep the barrier of the device at a certain distance from a blade surface. In use, i.e. when the device is secured around a wind turbine blade of a parked wind turbine, the device may modify the air flowing around the wind turbine blade and avoid, or at least reduce, vortex and/or stall induced vibrations. A light device which is easy to mount and unmount, and which may provide efficient vibration mitigation, may be provided due to the supports and the barrier as described herein.

As there is a gap between the barrier and the blade, the barrier may avoid contact with serrated edges on a trailing edge of the wind turbine blade. Damage to the serrations may therefore be reduced with such a vibration mitigating device. Also, in general damage to a blade, in particular to a blade surface, may be reduced for the same reason.

Throughout this disclosure, a barrier may be understood as an element configured to modify the air flow before it reaches a wind turbine blade surface. The barrier may be configured to significantly disturb the air flow, e.g. its magnitude and/or its direction, before the air flow reaches a local surface of a wind turbine blade. For example, air flow, or a component of the air flow, moving towards a local blade surface in a direction substantially perpendicular to a length of the blade may encounter the barrier. In some examples, the barrier may be configured to make the airflow more turbulent.

Throughout the present disclosure, the terms "standstill" and "parked" are used interchangeably, and may be understood as a situation in which the wind turbine is not producing electricity, and the rotor is substantially standing still. The rotor may or may not be locked in standstill. For instance, a wind turbine may be parked or in standstill during installation and/or commissioning. A wind turbine may also be parked for e.g. maintenance reasons after operating normally, i.e. producing energy, or in case of a prolonged grid loss.

Herein it may be understood that a wind turbine is in operation when its rotor is rotating at a speed high enough to produce energy and the generator of the wind turbine is producing electrical power.

In a further aspect of the disclosure, a method for mitigating vibrations of a parked wind turbine is provided. The method comprises moving a device comprising a barrier extending between a proximal support and a distal support around a wind turbine blade and towards a root of the blade by pulling one or more ropes, e.g. two ropes, attached at or near the proximal support, e.g. to the proximal support. The method further comprises securing the device.

Still in a further aspect of the disclosure, a device for mitigating vibrations of a parked wind turbine is provided. The device comprises a barrier extending longitudinally between a first stiffening ring and a second stiffening ring. The device is configured to surround a wind turbine blade and to provide a gap between the barrier and the wind turbine blade.

BRIEF DESCRIPTION OF THE DRAWINGS

FIGS. 6A and 6B schematically illustrate and compare a cross-section of a wind turbine blade with a device for mitigating vibrations mounted to the blade at two different times;

FIG. 7 schematically illustrates a view from a blade root towards a blade tip of another example of a device for mitigating vibrations mounted to the blade;

FIGS. 9A and 9B schematically illustrate two steps of a method for mitigating vibrations of a parked wind turbine:

FIG. 10 schematically illustrates a plurality of flapping elements arranged with a vibration mitigating device, in cross-section, according to an example;

DETAILED DESCRIPTION OF EXAMPLES

Figure 1:
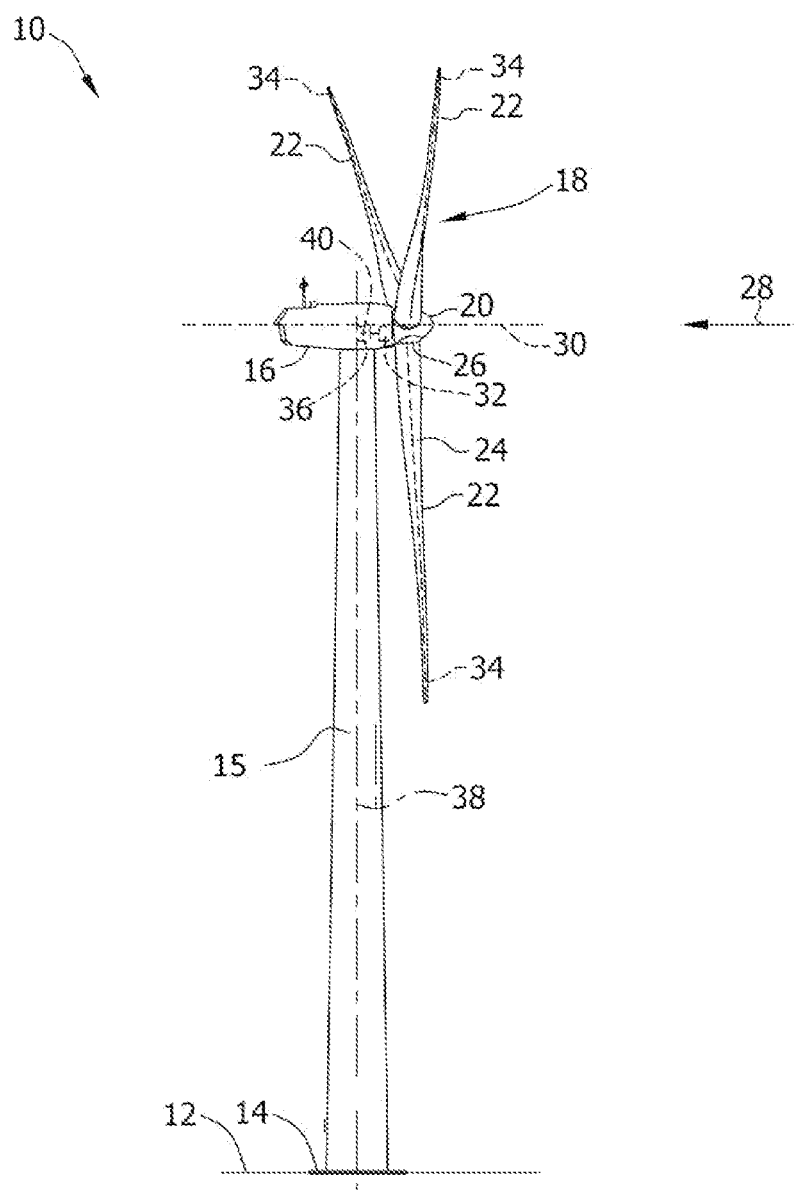
FIG. 1 illustrates a perspective view of one example of a wind turbine.

Reference now will be made in detail to embodiments of the invention, one or more examples of which are illustrated in the drawings. Each example is provided by way of explanation of the invention, not as a limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root region 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 includes a processor 40 configured to perform the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
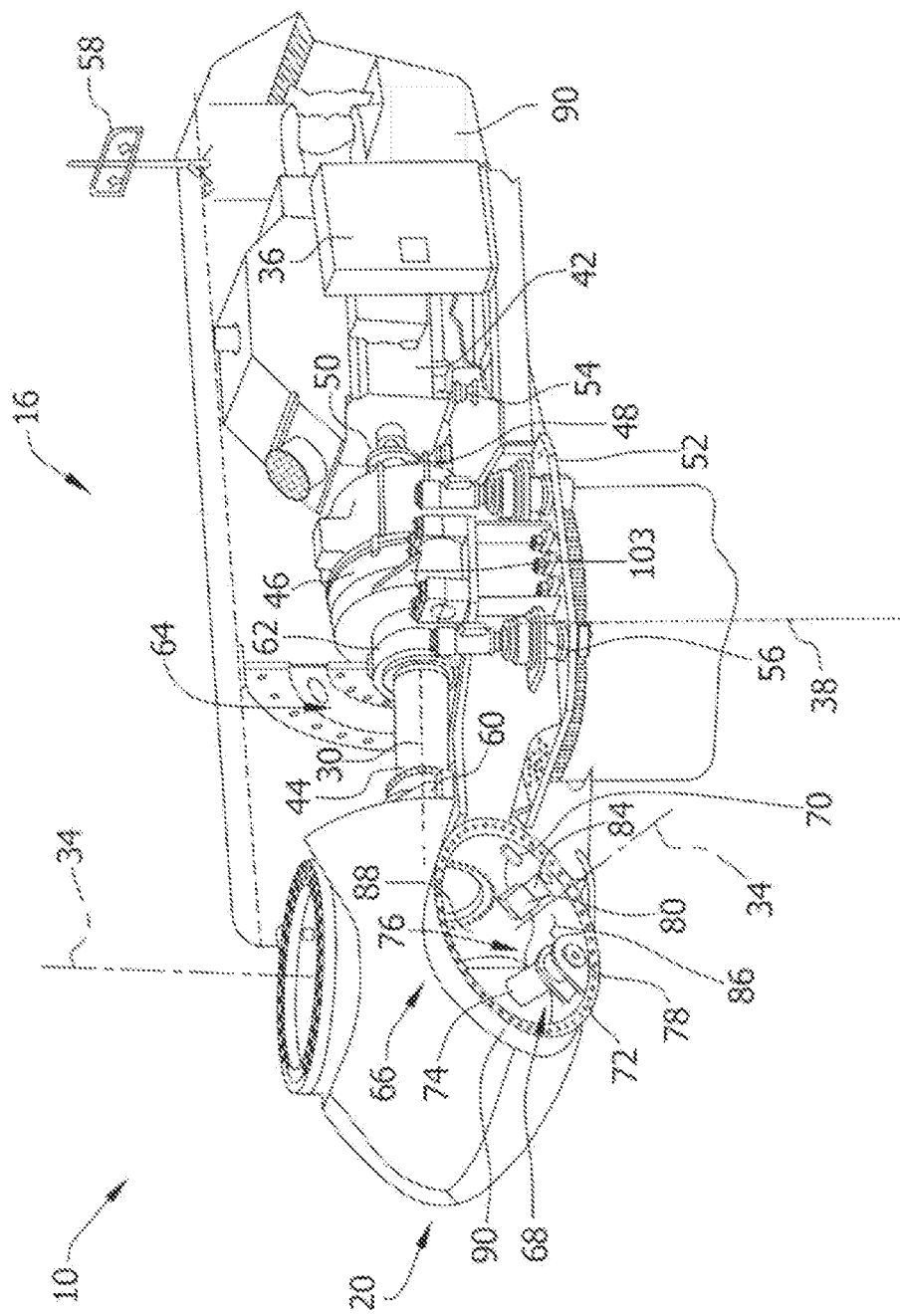
FIG. 2 illustrates a simplified, internal view of one example of the nacelle of the wind turbine of the FIG. 1.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400V to 1000 V into electrical energy having medium voltage (10-35 KV). Said electrical energy is conducted via power cables from the nacelle 16 into the tower 15.

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct drive wind turbine without gearbox 46. Generator 42 operate at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angel of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface of hub 20 and may be coupled, directly or indirectly, to the outer surface.

Figure 3:
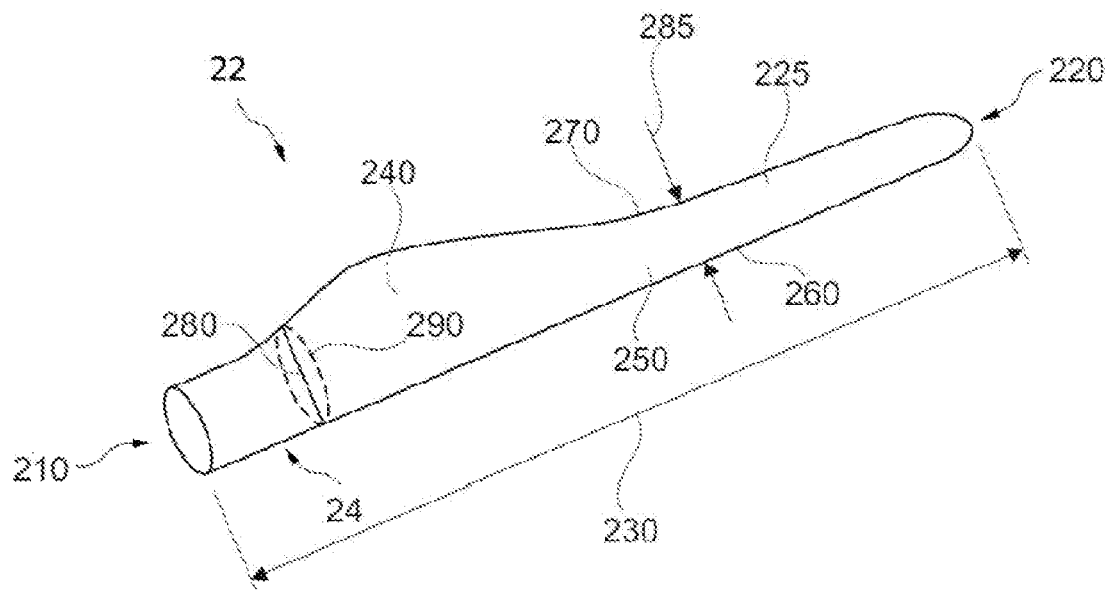
FIG. 3 illustrates a schematic perspective view of a wind turbine blade shown in FIG. 1.

A schematic perspective view of a wind turbine blade 22, e.g. one of the rotor blades 22 shown in FIG. 1, is illustrated as an example in FIG. 3. The rotor blade 22 includes a blade root 210, a blade tip 220, a leading edge 260 and a trailing edge 270. The blade root 210 is configured for mounting the rotor blade 22 to the hub 20 of a wind turbine 10. The wind turbine blade 22 extends lengthwise between the blade root 210 and the blade tip 220. A span 230 defines a length of the rotor blade 22 between said blade root 210 and blade tip 220. A chord 280 at a given position of the blade is an imaginary straight line joining the leading edge 260 and the trailing edge 270, the cross-section generally having airfoil shaped cross-section. As is generally understood, a chordwise direction is substantially perpendicular to a spanwise direction. Also, the chord 280 may vary in length 285 as the rotor blade 22 extends from the blade root 210 to the blade tip 220. The wind turbine blade 22 also includes a pressure side 240 and a suction side 250 extending between the leading edge 260 and the trailing edge 270. A tip region 225 may be understood as a portion of a wind turbine blade 22 that includes the tip 220. A tip region may have a length of 33%, 30%, or 25% of the span or less. A root region 24 may be understood as a portion of the blade that includes root 210. A root region may have a length of e.g. 33%, 30% of the span or less.

The rotor blade 22, at different spanwise positions, has different aerodynamic profiles and thus can have airfoil shaped cross-sections 290, such as a symmetrical or cambered airfoil-shaped cross-section. Close to a root of the blade, the cross-section of the blade may be rounded, even circular or almost circular. Closer to a tip of the blade, the cross-section of the blade may be thinner and may have an airfoil shape.

When a wind turbine is parked or stopped, vibrations caused by the air flowing around the wind turbine, in particular around the wind turbine blades, may stress and damage the wind turbine blades and the wind turbine. The wind turbine rotor may or may not be locked in these situations.

At least two types of oscillations or vibrations may happen particularly when the turbine is parked. The first ones are so-called vortex induced vibrations (VIVs), and these can arise when an angle of attack for a blade or airfoil portion is around 90 degrees. Vortex shedding may contribute to enhance the wind turbine blade oscillation. The second type of oscillations are stall induced vibrations (SIVs) which can arise when the angle of attack is close to stall angles (e.g. 15 degrees-30 degrees). The angle of attack may be understood as a geometrical angle between a flow direction of the wind and the chord of a rotor blade or a local chord of a rotor blade section.

Devices 300 as described herein may reduce vibrations when the wind turbine is parked. The performance of the wind turbine may not be negatively affected as the device(s) may be removed before the wind turbine starts normal operation. One or more devices 300 may be particularly useful during installation and/or commissioning of a wind turbine. It may be also useful if the wind turbine is stopped, e.g. for maintenance.

A device 300 for mitigating vibrations of a parked wind turbine is provided. The device 300 comprises a proximal support 310 configured to be arranged around a first portion 221 of a wind turbine blade 22, a distal support 320 configured to be arranged around a second portion 222 of the wind turbine blade, and a barrier 330 extending between the proximal support 310 and the distal support 320. The first portion 221 of the wind turbine blade 22 is at a different longitudinal position along the blade 22 than the second portion 222 of the blade 22. The proximal 310 and distal supports 320 are configured to provide a gap 350 between the device 300 and a wind turbine blade surface.

Figure 4A:
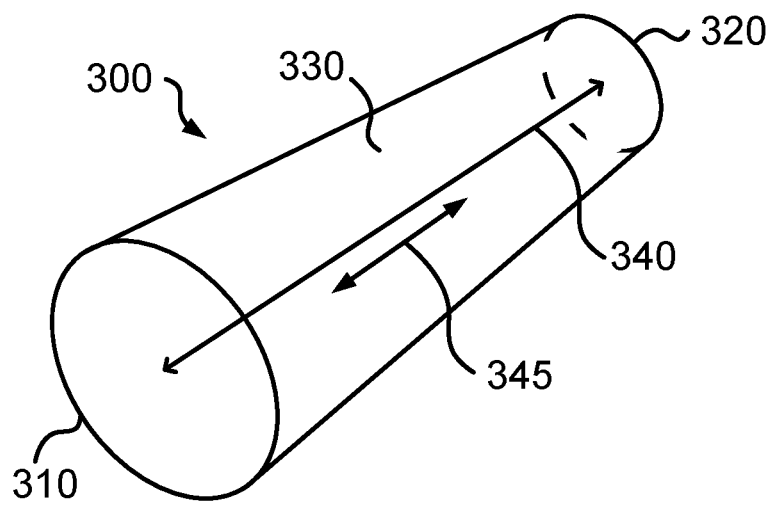
FIGS. 4A, 4B and 5 schematically illustrate perspective views of three examples of devices for mitigating vibrations of wind a turbine.
Figure 4B:
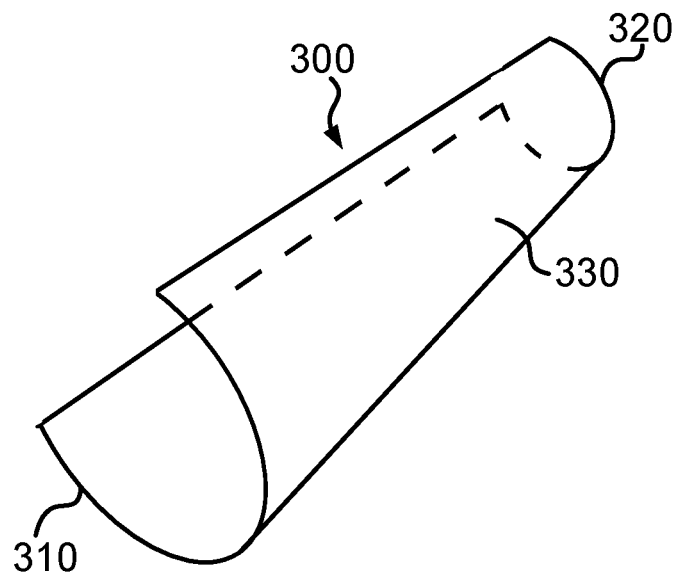

FIGS. 4A and 4B schematically show two different examples of a device 300. In both figures, the device 300 comprises a proximal support 310 and a distal support 320. The proximal 310 and distal 320 supports may be configured to surround a wind turbine blade 22 in cross-section. A proximal support 310 may be configured to be closer to a root 210 of a wind turbine blade 22 than to a tip 220 of the wind turbine blade 22 when the device 300 is in use. Likewise, a distal support 320 may be configured to be closer to the tip 220 of the blade 22 than to the root 210 of the blade 22 when the device 300 is in use. A proximal support 310 may be longer and/or wider than a distal support 320. For example, if the supports have a substantially circular shape, e.g. if they are rings, the proximal ring 310 may have a larger diameter than the distal ring 320.

The proximal support 310 is configured to be arranged around a first longitudinal portion 221 of a wind turbine blade 22 (see FIG. 9A). The distal support 320 is configured to be arranged around a second longitudinal portion 222 of the blade 22 (see FIG. 9A). Throughout this disclosure it may be understood that the first longitudinal portion 221 may be closer to the blade root 210 than the second longitudinal portion 222. A chord length 285 of the first longitudinal portion 221 may therefore be larger than a chord length 285 of the second longitudinal portion 222.

Figure 4C:
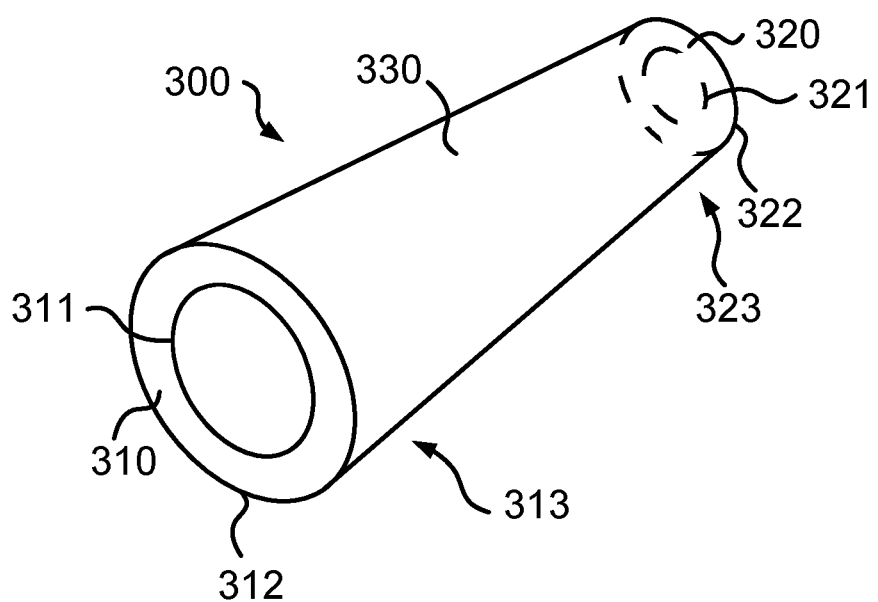
FIGS. 4C and 4D schematically illustrate perspective views of further examples of devices for mitigating vibrations of wind a turbine.

In some examples, as e.g. in FIGS. 4A-4C, the proximal support 310 and the distal support 320 may be provided as separate elements. In other examples, the proximal and distal supports may be connected to one another, may be comprised in a supporting structure or may be integrally formed. For instance, a supporting structure may comprise a plurality of elements, two of which are a proximal support and a distal support. In some examples, if the supporting structure is integrally formed, a proximal support and a distal support may be understood as a proximal end and a distal end of the supporting structure.

The device 300 further comprises a barrier 330 extending between the proximal support 310 and the distal support 320. A barrier 330 joins the proximal support 310 and the distal support 320. In some examples, a thickness of the barrier may be negligible or very small in comparison to its length and its width. A barrier may in some examples be a textile-based barrier, e.g. a tarp, a weave, a cloth or a net. A barrier may in some examples have four edges. When fully extended on a flat surface, e.g. on the ground, a barrier 330 may have a rectangular or trapezoid shape.

In some examples, the barrier 330 is integrally formed with the proximal 310 and distal 320 supports. In some other examples, the barrier 330 is formed independently from the proximal 310 and distal 320 supports. For instance, if the supports 310, 320 and the barrier 330 are made of a same material, e.g. a metal, a plastic or a weave, the three elements 310, 320, 330 may be integrally formed in some examples. For example, the supports 310, 320 and the barrier 330 may be made of wicker or a similar fiber. In other examples, the three elements 310, 320, 330 may be made of a same material, but may be formed and assembled separately. For example, wire may be used for providing the supports 310, 320 and the barrier 330. The wire barrier 330 may then be attached to the wire supports 310, 320. The wire may be coated or covered. For example, the wire may be plasticized. Still in other examples, the three elements 310, 320, 330 may be made of a different material, but may be formed and assembled separately. For example, the supports 310, 320 may be metallic and a net-like or cloth-like material may be attached to the supports. In some examples, a barrier 330 may be tied to the proximal 310 and distal 320 supports.

The proximal 310 and distal 320 supports are configured to provide a gap 350 between the barrier 330 and the wind turbine blade 22 (see e.g. FIG. 7). The device may be configured to keep the barrier 330 separated from a blade surface, i.e. to provide a gap 350 between the totality of the barrier and a corresponding blade surface below the barrier. For instance, in the example of FIG. 7, where the proximal 310 and distal 320 supports of a device 300 may be seen around a blade 22, the proximal support 310 does not touch the blade surface. In other examples, the proximal 310 support may touch the blade 22. The distal support 320 touches the leading edge 260 and the trailing edge 270 in this example. The barrier 330, in any of its cross-sections, does not touch a blade surface either. At least the barrier 330 is therefore completely separated from a local blade surface.

Figure 4D:
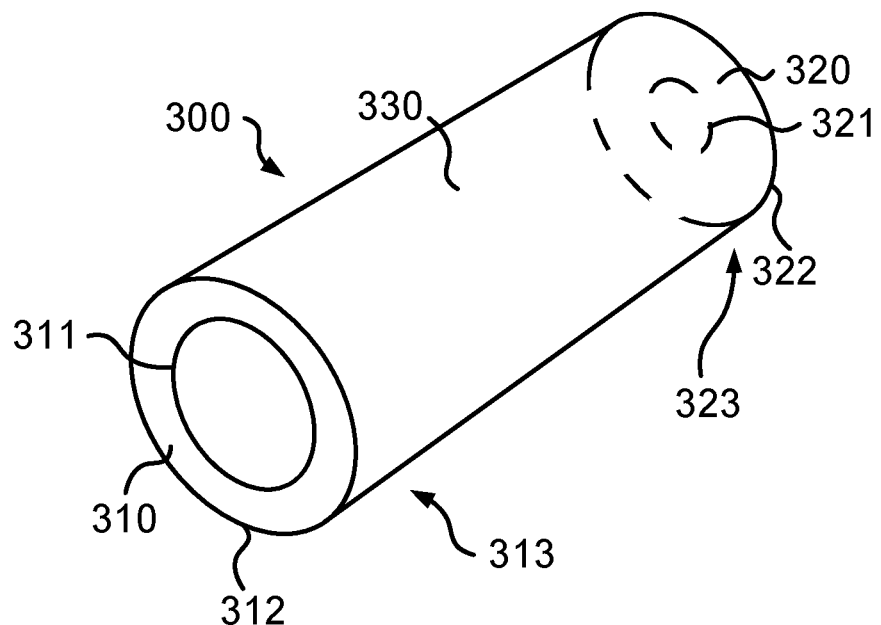

The proximal 310 and distal 320 supports may have, in cross-section an internal edge 311, 321 and an external edge 312, 322. In some examples, a perimeter of an internal edge 321 of the distal support 320 may be shorter than a perimeter of an internal edge 311 of the proximal support 310. This may be seen in FIGS. 4C and 4D. I.e., the distal support 320 may get stuck around a blade 22 earlier than the proximal support 310. An internal edge 311, 321 (or internal surface if not in cross-section) may be configured to follow a local profile of a blade in cross-section in some examples. In these or other examples, the internal edge may have a substantially circular or elliptic shape. The proximal 310 and/or distal 320 supports may have a doughnut-like shape in some examples. The supports 310, 320 may be hollow in some of these examples. In other examples, the proximal 310 and/or the distal 320 supports may comprise an internal ring and an external ring connected, e.g. radially connected, to one another. In some examples, the proximal 310 and distal 320 supports may be inflatable.

A distance 350 between the barrier 330 and a local surface of a wind turbine blade 22 may be larger or smaller depending on a distance between an external edge 312, 322 and an internal edge 311, 321, in cross-section, of the proximal 310 and/or the distal 320 supports. For example, in FIGS. 4C and 4D, a gap 350 to a local blade surface may be substantially the same in a proximal region 313 with the devices 300 of both figures, but a gap 350 in a distal region 323 may be larger with the device of FIG. 4D than with the device of FIG. 4C.

The supports 310, 320 may be configured to maintain their shape. That is to say, the supports may be stiff enough such that, when the device is in use, they are able to keep a substantially same or similar shape as when mounted around the blade 22. I.e., they do not undergo substantially any or significant deformation due to external forces, e.g. such as forces exerted by wind gusts. Therefore, a gap 350 between the device 300 and the blade 22 may be kept while the device is in use. The proximal 310 and distal 320 supports may also be referred to as proximal stiffening support 310 and distal stiffening support 320.

The stiffening supports 310, 320 may have a suitable size and shape to surround at least partially the wind turbine blade 22, especially in cross-section (i.e. in a plane substantially perpendicular to a length 230 of the blade). In some examples, as e.g. in the example of FIG. 4B, the device 300 may have a substantially U-shape or C-shape in cross-section. The size and shape of the device 300, and therefore of the stiffening supports 310, 320 and the barrier 330, may be such that the device 300 may surround a wind turbine blade 22 at least in part in cross-section. The device 300 may be configured to cover at least the leading edge 260 of a blade 22. It may be understood that not all the leading edge 260 of the blade 22 has to be covered by the device 300 necessarily, but that a certain longitudinal portion of the leading edge 260 may be covered. For instance, the device 300 may be configured to extend from a tip region 225 of the blade 22 to about half of the blade length 230 in some examples.

In some examples, as e.g. in the example of FIG. 4A, the device 300 may have a substantially circular cross-section. The proximal 310 and distal 320 supports may therefore have a circular shape. In other examples, the device 300 may have a substantially elliptic cross-section, and therefore the stiffening supports may also have an elliptic shape. The device may be configured such that the major axis of an elliptic cross-section is substantially parallel to a chord 280 when mounted to a blade 22.

In some examples, the device 300 may taper from the proximal support 310 towards the distal support 320. In particular, tapering may occur at least from an internal edge 311 or surface of the proximal stiffening device 310 towards an internal edge 321 or surface of the distal stiffening support. This may help to arrange the device 300 at a desired lengthwise position along the blade 22. For example, the size of the distal support 320, e.g. a diameter of the distal support, may be selected such that the device 300 stops its movement along the blade 22 at a desired position. I.e., if a device 300 is positioned around the blade 22 and moved, e.g. slid, towards the root 210, the device may stop when an interior surface of the distal stiffening support 320 touches a blade surface and therefore the distal stiffening support 320 can no longer keep moving along the span 230 of the blade 22. A device may have a substantially truncated cone shape in some examples, e.g. as in FIGS. 4A, 4C and 5. In particular, the proximal 310 and distal 320 stiffening supports together with the barrier 330 may have the shape of a truncated cone. Other shapes, e.g. a substantially cylindrical shape, are possible. The device 300 of FIG. 4D has a substantially cylindrical shape, but an internal diameter of the distal support 320 is smaller than an internal diameter of the proximal support 310. The diameters are measured along a same direction.

Having a device 300 configured to provide a gap 350 between its barrier 330 and a wind turbine blade 22, when in use, may help to vary the time at which vortices are shed from a blade surface at different lengthwise positions, and therefore to decorrelate the vortex sheddings. A relatively light device easy to mount may be provided.

In some examples, the device 300 may have a retracted position and an extended position. A distance 340 between the proximal 310 and distal 320 stiffening supports may be larger in the extended position than in the retracted position. For example, if the device 300 of FIGS. 4A, 4C, 4D and 5 have these two positions, they would be shown in the extended position in these figures. The device 300 may be compressed, e.g. in an accordion-like manner, such that it occupies less space in the retracted position than in the extended position.

In some examples, a barrier 330 may be elastically bendable. Herein, elastically bendable may mean that, after bending, the barrier can go back to its previous shape. For instance, a device 300 with an elastically bendable barrier 330 may be compressed, e.g. in an accordion-like manner, to a retracted position for transporting it to a wind turbine site and then extend it to mount it around a wind turbine blade 22. A barrier which, after bending, cannot return to its previous shape, may be referred to as plastically bendable. An elastically bendable barrier may enable an easier manipulation of the device. An elastically bendable barrier may be moved towards a blade surface or away from the blade surface by the wind when the device is in use, but in such a way that the barrier does not touch the blade surface and a gap 350 is kept between the barrier and a corresponding local blade surface.

In some examples, a device 300 may further comprise one or more additional supports 315 between the proximal 310 and distal 320 supports. For example, the device of FIG. 5 includes two additional supports 315 and the device of FIGS. 9A-9B comprises three additional supports 315. The device of FIG. 5 could correspond to the device of FIG. 4A, but including the additional supports. The device of FIG. 4B could also include one or more additional stiffening supports 315, e.g. having a U- or C-shape, in other examples. The devices of FIGS. 4C and 4D may include one or more additional supports 315 too. A barrier 330 may be attached to zero, one, two or more, including all, additional supports. Attaching may include tying and/or gluing in some examples. Other options of attachment are possible. A suitable way of attachment may be chosen depending on the material or type of the barrier 330. For example, if the barrier is a net, the net may be tied to the additional stiffening supports 315.

Figure 5:
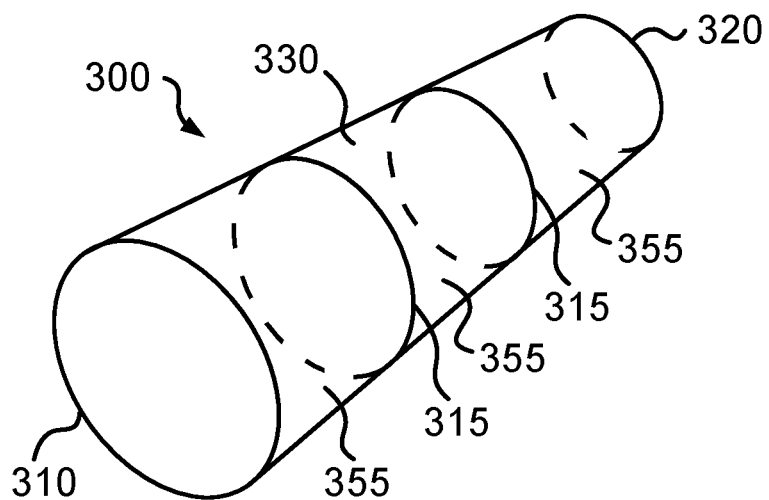

One or more additional supports 315 may help to keep the gap 350 between the barrier 330 of the device and a blade surface. For example, if the barrier 330 is not sufficiently stiff to extend substantially straight between the proximal 310 and distal 320 stiffening supports, one or more additional supports 315 can be added such that the barrier 330 extends substantially straight. In FIG. 5, the barrier 330 may become curved if the additional stiffening supports 315 are removed. The additional supports 315 may therefore help to keep a gap 350 between the barrier 330 and a blade surface, e.g. along a length of the barrier and the blade. In particular, the additional supports 315 may help, when the device is in use, to avoid that a distance between the barrier and the blade surface decreases beyond a predetermined threshold.

The predetermined threshold may correspond to a distance between an additional stiffening support 315 and a blade surface. A barrier portion between two stiffening supports (be it proximal-additional, additional-additional or additional-distal supports) may still be moved towards or away a blade surface when in use, but the amplitude of this movement could be much less when compared to a situation where the additional stiffening supports 315 are missing.

The additional stiffening supports 315 may also help to retract and extend the device. For example, if the device 300 of FIG. 5 is compressed along a longitudinal direction 345, the device may bend in barrier regions between pairs of adjacent stiffening supports. For example, the device of FIG. 5 includes three bending regions 355 which may bend when compressing the device, each region 355 between adjacent supports: a first bending region between the proximal support 310 and an adjacent first additional support 315, a second bending region between the first additional support and an adjacent second additional support, and a third bending region between the second additional support and the distal support. The additional stiffening supports 315 may facilitate an organized and controlled transition from an extended position to a retracted position and vice versa. Storage and transport of the device 300 may be easier to perform with the additional stiffening supports 315.

One or more additional stiffening supports 315 may have, in cross-section, an internal edge and an external edge, similarly to what has been previously explained with regard to the proximal 310 and distal 320 stiffening supports. An internal edge of an additional stiffening support 315 (or internal surface if not in cross-section) may be configured to follow a local profile of a blade in cross-section in some examples. In these or other examples, the internal edge may have a substantially circular or elliptic shape. The additional stiffening supports 315 may have a doughnut-like shape in some examples. In other examples, the additional stiffening supports 315 may comprise an internal ring and an external ring connected, e.g. radially connected, to one another. In some examples, the additional stiffening supports 315 may be inflatable. In some examples, the additional stiffening supports 315 may have a substantially same shape and/or include same materials than the proximal 310 and distal 320 stiffening supports. In other examples, the additional stiffening supports 315 may have a different shape and/or include different materials than the proximal 310 and distal 320 stiffening supports.

In some examples, a barrier 330 may be stiff, i.e. rigid, enough for dispensing with additional supports 315. The material of the barrier 330 may determine whether one or more additional stiffening supports are required. For example, if the barrier is made of a cloth-like material, they may be necessary. But if the barrier is made of plastic, they may be dispensed with. It may be understood that a barrier 330 is stiff enough if a local separation between the barrier 330 and a blade surface while the device 300 is in use may be kept within a range of an initial local distance between the barrier and the blade surface (e.g. immediately after securing the device to the blade 22) plus or less a 30%, more in particular a 20%, and more in particular a 10%, of that distance.

In some examples, the barrier 330 may be permeable. A permeable barrier may be understood throughout this disclosure as a barrier comprising a plurality of holes, channels or pores such that air can pass through them, and therefore from one side of the barrier to the other side of the barrier. In some other examples, the barrier 330 may be non-permeable, i.e. air would not be able to go through the barrier 330, but it would have to surround the barrier instead. Any of the devices shown in the figures may have a permeable barrier. Likewise, any of the devices shown in the figures may alternatively have a non-permeable barrier.

If the barrier 300 is permeable, the air flows through the barrier instead of around it. The pores in the barrier may increase a resistance to the flow of air through the barrier. The disorganization of the air flow may increase, and the air flow may therefore become turbulent or more turbulent than before traveling through the barrier pores. Turbulent air flow caused by the device 300 may separate from a blade surface at different times than other air flowing around different longitudinal blade portions which lack the device 300, and a spanwise correlation of the vortex sheddings may accordingly be reduced. Therefore, vibrations such as VIVs and/or SIVs may be reduced too.

The mitigation of vibrations may be particularly effective by having a permeable barrier, the barrier 330 being separated from a blade surface during all the time in which the device is in use. If a gap 350 between the barrier 330 and a blade surface is maintained substantially constant or with small variations to a local blade surface while in use, drag and turbulence creation may be increased in comparison to a situation in which a barrier is non-permeable, or to a situation in which a permeable barrier fits tightly around the blade, or wherein a permeable barrier is not able to keep a gap between the barrier and a local blade surface during the use of the device 300.

Also, a permeable barrier 330 may avoid, or at least reduce, self-shedding of vortices. If a barrier is non-permeable, vortices may be shed from itself, e.g. if it is cylindrical. But this effect may be mitigated, and even avoided, when the barrier is comprises a plurality of pores.

In some examples, a thickness of a barrier 330 may be between 0.3 mm and 30 cm. The thickness of a barrier 330 may for instance vary depending on the type of permeable barrier used. For example, a sponge-like barrier may be thicker than a net-like barrier. A sponge-like barrier may have a thickness between 0.5 cm and 10 cm, and more in particular between 1 cm and 5 cm, in some examples. A net-like barrier may have a thickness between 0.3 mm and 2 cm, and more in particular between 1 mm and 7 mm, in some examples. FIGS. 6A and 6B schematically illustrate a cross-section of a wind turbine blade 22 with a device for mitigating vibrations around it.

A situation in which a gap 350, i.e. a distance between the barrier 330 and a corresponding blade surface, is kept substantially constant, or at least without great variations, is shown in FIG. 6A. As illustrated in this figure, a shape of the barrier 330 in cross-section may be kept during the period in which the device 300 is mounted to the blade 22. A different situation is shown in FIG. 6B. In the example of FIG. 6B, a gap 350 between a barrier and a local blade surface is not kept substantially constant or within certain range (e.g. the range indicated above of an initial distance plus and minus a 10% or 30% of the initial distance) during the period in which the device is in use. The shape of the barrier 330 in cross-section varies depending on whether the air flow comes from. The situation in FIG. 6B may correspond to a moment in which the wind is flowing from the upper left corner to the lower right corner of the figure. In a different moment, the shape of the barrier 330 in cross-section may vary from what is shown in FIG. 6B, e.g. if the direction of the wind changes.

A permeable and substantially stiff barrier 330, e.g. due to the material used for the barrier and/or the use of one or more additional stiffening supports 315, as the one schematically illustrated in FIG. 6A, may therefore provide an effective and more predictable way to reduce wind turbine vibrations.

In some examples, the permeable barrier may be a net. A net may be understood as a threaded material with spaces (pores) in between, allowing at least air to go through them. A net may be made of threads of rope, string, wire or plastic in some examples. In some other examples, the permeable barrier may be made of a sponge-like material.

In some examples, the plurality of pores of a permeable barrier may represent between the 20% and the 70% of an external surface of the barrier of the device. This range of external surface of a total external surface of a barrier occupied by a plurality of pores may help to increase drag and turbulence, optimizing vibration mitigation. For example, if the barrier is a net, the plurality of pores may occupy between the 20% and the 70% of a total external surface of the net. If a net is seen as a 2D (two-dimensional) or quasi-2D element, the plurality of pores may occupy between the 20% and the 70% of the total surface of the net.

In some examples, the plurality of pores of a permeable barrier may represent between 20% and 70% of a volume of the barrier of the device. For example, if a barrier is a sponge-like barrier, the plurality of pores may occupy between 20% and 70% of a volume of the sponge-like barrier. This range of volume occupied by pores may also help to increase drag and turbulence.

In some examples, a pore size may be between 0.5 and 20 cm, and more in particular between 1 and 10 cm. For example, if the barrier is a net and the openings of the net are substantially squared or circular, the opening (pore) size may be between 1 and 10 cm in some examples. The size may refer to a length of a side of a substantially squared pore or a radius of a substantially circular pore in these examples.

In some examples, the device 300 may further comprise an undulated or helical strake (not shown). A strake may be understood as one or more fins that meander or spiral along or around a length 340 of the barrier 330. The undulated or helical strake may break vortices and thus reduce their ability to correlate along a spanwise direction 345. The vibrations may be further mitigated by the strake. A device having a U- or C-shaped cross-section, e.g. the one in FIG. 4B, may include an undulated strike, whereas a device having a circular or elliptical cross-section, e.g. the one in FIG. 4A or 5, may include a helical strike. A strake may be attached to the proximal 310 and distal 320 stiffening supports and/or one or more additional stiffening supports 315. The strake may be further attached to the barrier 330.

Figure 8A:
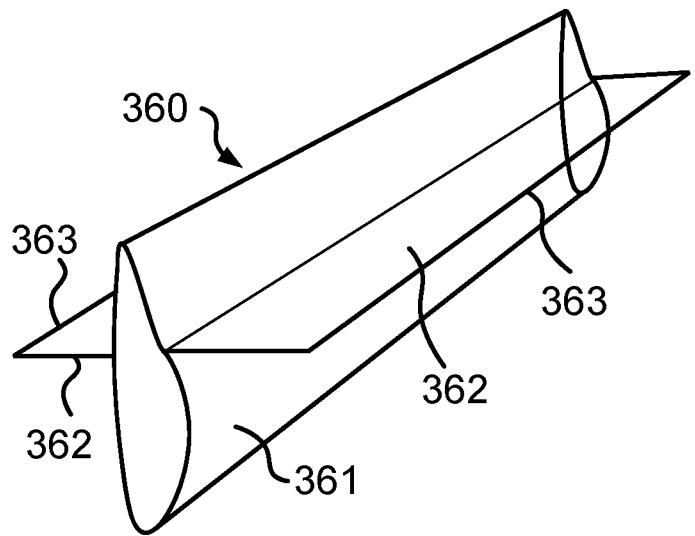
FIGS. 8A and 8B schematically illustrate two examples of supporting sleeves.
Figure 8B:
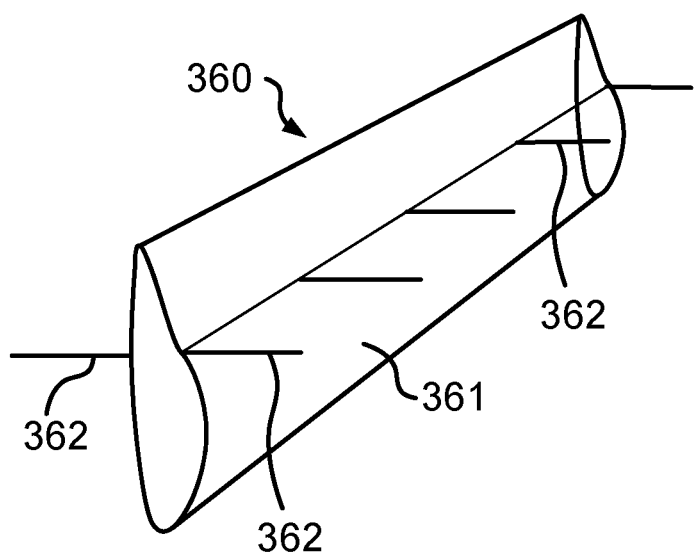

In some examples, the device 300 may further comprise a supporting sleeve 360 configured to surround a wind turbine blade 22 and to support the barrier 330. FIG. 7 schematically shows a view from a blade root 210 towards a blade tip 220, a device 300 being mounted to the blade 22. The proximal 310 and distal 320 stiffening supports may be seen. A supporting sleeve 360 comprises a flexible base 361 configured to be fitted around the wind turbine blade 22, e.g. to wrap the blade, and two or more protrusions 362 configured to support the barrier 330. FIGS. 8A and 8B schematically show two examples of supporting sleeves 360. One or more protrusions 362 may be provided in a portion of the sleeve base 361 configured to cover the suction side 250 of a blade and one or more protrusions 362 may be provided in a portion of the sleeve base 361 configured to cover the pressure side 240 of the blade.

In FIG. 8A, the sleeve 360 comprises two plate-like protrusions extending outwardly from the base 361. One may be arranged on a suction side 250 of the blade, and the other one may be arranged on the pressure side 240 of the blade. An outward edge 363 of the protrusion 362 is configured to limit the movement of a barrier 330 towards a blade surface. FIG. 8B illustrates rib-like protrusions 362, which may also prevent a barrier 330 to move closer to a blade surface. A first plurality of ribs may be arranged on a suction side 250 of the blade, and a second plurality of ribs may be arranged on the pressure side 240 of the blade. Other kind of protrusions 362 may be used in other examples. The position of the protrusions 362 around a base 361, in cross-section, may also differ in other examples. For instance, a sleeve 360 may be added to the device of FIG. 4B, and one or more protrusions 362 may extend towards the valley 335 of the device. The device 300 may be secured to the wind turbine blade 22 such that the valley 335 faces the leading edge 260. The number and type of protrusions 362 used may be adapted to the barrier 330 of the device, e.g. to the material of which the barrier is made of. The base 361 of the sleeve may help to protect serrations on the trailing edge 270 of a blade 22.

A supporting sleeve 360 may be used with both permeable and non-permeable barriers. A supporting sleeve 360 may also be used for devices including or lacking additional stiffening supports 315.

In some examples, the barrier 330 may be attached to the protrusions 362. In other examples, the barrier may be left unattached to the protrusions 362. A stiffening support 310, 315, 320 may be attached to the protrusions 362. For example, a proximal 310 and distal 320 stiffening supports may be attached to the protrusions, e.g. to an outward edge 363 of a protrusion. Gluing, tying or other suitable ways of attaching may be used.

A wind turbine blade 22 comprising a device 300 as described above may be provided. A device 300 may be configured to be installed on the half of the blade 22 including the blade tip 220, e.g. on a tip region 225 of the blade 22. The tip region 225 may be the portion of the wind turbine blade that vibrates the most when the wind turbine is parked. Therefore, it may be particularly advantageous to install the device in this region of the blade. Installing only one device 300 per blade 22 may be sufficient and easier than installing more than one device per blade, but providing more than one device 300 as described herein around the same blade 22 is not precluded.

In some examples, the vibration mitigating device 300 may further comprise a plurality of flapping elements 365 arranged at least partially around the barrier 330. The flapping elements 365 are configured to flap under the influence of the wind. The flapping elements 365 may be flexible such that their shape may be varied by the wind.

FIG. 10 schematically illustrates a plurality of flapping elements 365 attached to a barrier 330 in cross-section. In this example, the wind blows from left to right, as indicated by the big horizontal arrow in FIG. 10. Small double headed arrows indicate that the flapping elements 365 are flapping. Although only some flapping elements 365 are shown in the example of FIG. 10, the flapping elements 365 may be arranged, e.g. attached, all around the barrier 330 in cross-section in any example. The plurality of flapping elements 365 may completely surround an outer surface of a barrier 330 in some examples, i.e. the flapping elements may be arranged around the device 300 in cross-section, and also along the entire length 340 of the device.

A flapping element may have two end portions: a restricted end portion 366 and a free end portion 367. The free end portion 367 may vibrate with a greater amplitude than the restricted end portion 366. For example, if the restricted end portion 366 is attached to a barrier 330, e.g. to an outer surface of the barrier, the free end portion 367 may be able to move in a larger region of space than the restricted end portion 366.

If wind blows in a certain direction, the free end portions of the vibration elements may be pushed in that direction, see FIG. 10. Besides this, as air flow detaches from a barrier outer surface and becomes turbulent, the turbulent detached air flow may cause the flapping elements 365 to move in other directions, e.g. in directions perpendicular to the direction in which the wind blows, see also FIG. 10. The local air flow felt by a group of flapping elements or by a single flapping element may be different. Therefore, each flapping element or a group of flapping elements may flap independently from other flapping elements. Also, as the detached air flow is turbulent, it may introduce or increase randomness in the vibration of the flapping elements. This randomness in the flapping may help to decorrelate vortex sheddings. The flapping may help to dissipate energy and to increase drag, which may help to dampen vibrations, e.g. VIVs and/or SIVs. Also, vibrations of the flapping elements 365 may reduce vortex shedding caused by the barrier itself.

Although herein a plurality of flapping elements 365 is arranged with a vibration mitigating device 300, such flapping elements may also be directly arranged with a wind turbine blade 22 or with a wind turbine tower 15. For instance, a plurality of flapping elements 365 may be arranged around at least a portion of a wind turbine tower 15.

In some examples, the flapping elements 365 may be stripes or flaps. The vibration elements may have different shapes, e.g. they may be rectangular or triangular in some examples.

In some examples, the flapping elements 365 may be independent between them. For instance, individual flapping elements may be attached to or suspended from the barrier 330. In some other examples, the flapping elements may be provided in a cover configured to be at least partially wrapped around the barrier. For instance, a plurality of flapping elements 365 may be attached to a cover, and the cover may be wrapped around the barrier. In other examples, the plurality of flapping elements 365 may be integrally formed with the cover, e.g. the flapping elements may be protrusions or lobes of the cover. In some examples, the cover may additionally comprise a plurality of openings. The air may therefore flow through the openings and further increase turbulence and damping. In some of these examples, the flapping elements may flap at least partially through these openings.

In some examples, the cover may be made of a textile, cloth, fabric or similar material with a number of cut-outs. The cut-outs form openings, and the parts of the textile that are separated from the remainder of the fabric may form the flapping elements.

In some examples, the vibration mitigating device 300 may comprise camouflage netting around the barrier. The camouflage netting may form flapping elements as hereinbefore described.

In some examples, the vibration mitigating device 300 may further comprise a plurality of fins 368 arranged at least partially around the barrier 330.

Figure 11A:
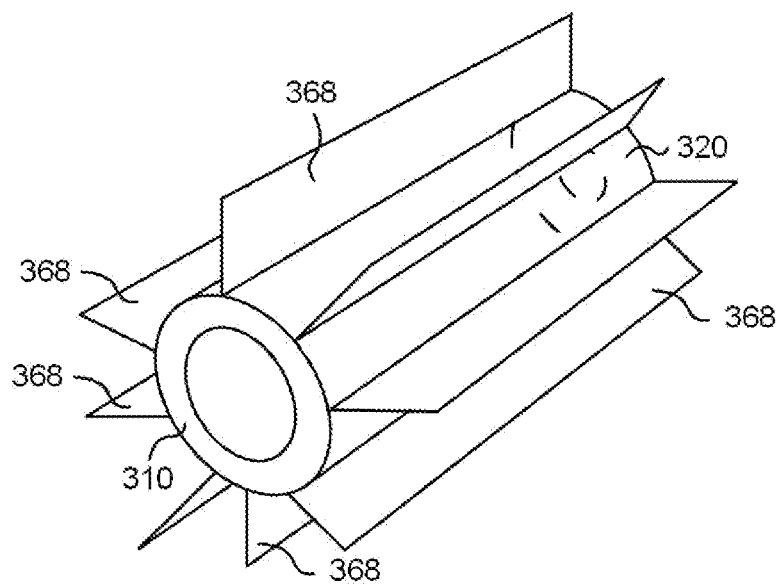
FIG. 11A schematically illustrates a perspective view of an example of a plurality of fins arranged with a vibration mitigating device.

FIG. 11A schematically shows a perspective view of a plurality of fins 368 protruding from a vibration mitigating device 300. In some examples, the fins 368 may be rigid. I.e. the fins may be configured to keep a substantially same shape in the absence of wind as in the presence of wind. In other examples, the fins 368 may be configured to follow a main or predominant direction of the wind. The flexible fins may be pivoting fins. In these examples, the fins 368 would be shown in an unloaded condition, i.e. in absence of wind, in FIG. 11A.

Substantially rigid fins may help to add drag in oscillations and help to mitigate wind turbine vibrations. Substantially flexible or pivoting fins may help to avoid or at least reduce vortices being shed by the device 330. Flexible fins may also add drag and help to mitigate wind turbine vibrations.

In some examples, an angular distance between adjacent fins 365, both for a plurality of substantially rigid fins and for a plurality of substantially flexible fins (in the unloaded configuration), in cross-section may be substantially constant. At least for the rigid fins, this may help to stabilize the vibration mitigating device when mounted around a wind turbine blade and wind blows from different directions. Undesired behavior and instabilities induced by the wind blowing from different directions may be avoided or at least reduced with respect to having a plurality of fins with a variable angular distance between adjacent fins. A response of the device to wind gusts coming from different directions may be more homogeneous.

Figure 11B:
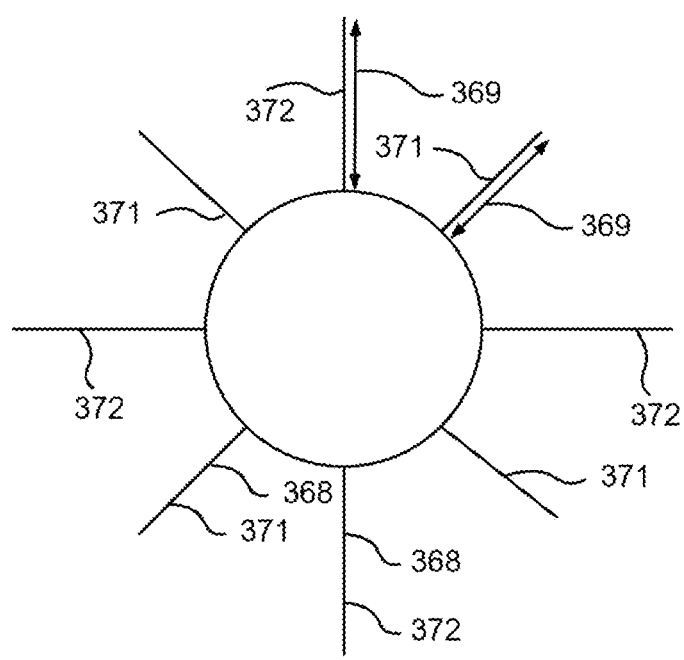
FIG. 11B schematically illustrates a cross-sectional view of an example of a vibration mitigating device and a plurality of rigid fins.

In some examples, all the fins may have a substantially same height 369. A height may be measured in a direction substantially perpendicular to a local surface of the barrier 330 or the device 300 when the fins 368 are mounted to the device 300. In other examples, the fins 365 may have different heights. In some of these examples consecutive fins 368 may have alternating heights 369. FIG. 11B schematically illustrates a cross-sectional view of a vibration mitigating device and a plurality of rigid fins 368. In this and other examples, a first group of fins 371 may have a first height, and a second group of fins 372, which is displaced with respect to the first group of fins 371, may have a second height bigger than the first height.

In some examples, the fins 368 may be non-permeable. I.e. air would not be able to go through the fins, but instead would be forced to flow around them. In other examples, one or more fins 368, including all the fins 368, may be permeable, i.e. they may comprise a plurality of holes, channels or pores such that air can pass through them, and therefore could pass from one side of a fin to the other side of the fin. In some of these examples, one or more fins 368 may comprise a camouflage netting attached to a plurality of rods. The rods may confer a substantially planar shape to the fins 368 when in an unloaded condition.

In some examples, the fins 368 may have serrated outer edges. Serrated edges may reduce the noise produced by wind flowing around the fins.

In some examples, flexible joints may be used to attach the fins 368 to the barrier 330. For instance, hinges may be used, and also flexible or displaceable (plastic) hinges may be used. Flexible joints may also be used to attach the flapping elements 365 to a barrier 330 in some examples.

In some examples, the fins 368 may be independent between them. For instance, individual fins 368 may be attached to or arranged with the device 330. In some examples, the fins 368 may be attached to the first 310 and second 320 supports, and optionally to additional supports 315. In other examples, the plurality of fins 368 may be attached to a flexible base configured to be fitted around the barrier 330, e.g. to wrap around the barrier. The first option may particularly be used with a permeable barrier 330 whereas the second option may be used particularly with a non-permeable barrier 330. In some examples, a device may comprise a permeable barrier 330, a plurality of flapping elements 365 and a plurality of fins 368.

In the examples of flexible fins, the fins 368 may be stiff enough such that in an unloaded condition they keep a substantially deployed configuration. I.e., they may be configured to resist substantial bending until they are subjected to an external force such when subjected to wind gusts. The fins 365 may be configured to be substantially perpendicular to a local surface of the device 300 in an unloaded condition, as e.g. shown in FIG. 11A.

Figure 11C:
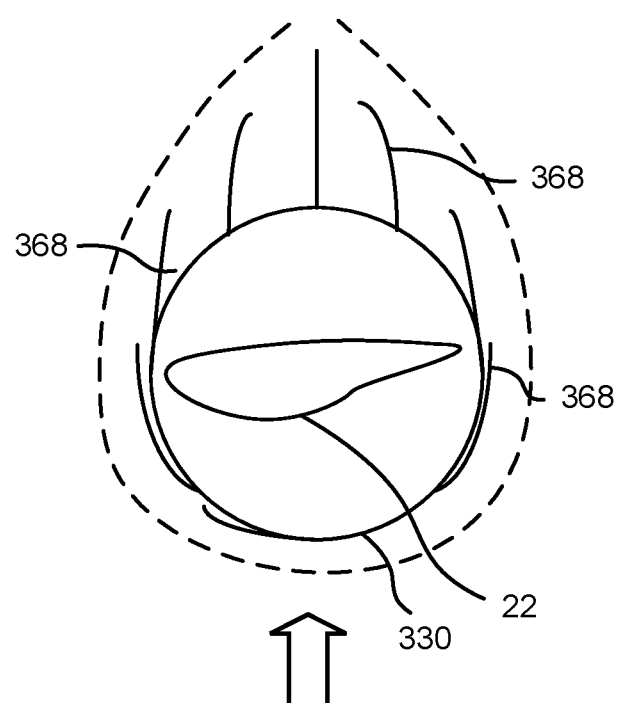
FIG. 11C schematically illustrates a cross-sectional view of an example of vibration mitigating device and a plurality of flexible fins.

The fins 368 may also be flexible enough such that in a loaded condition, i.e. in the presence of wind, they are able to follow the wind. FIG. 11C shows a cross-sectional view of a plurality of fins 368 following a direction of the wind, which in this example blows vertically upwards as indicated by the arrow of FIG. 11C.

The flexible fins 368 may be configured such that, when the vibration mitigating device 300 is mounted to a wind turbine blade 22, the device 300 and the plurality of fins 368 may form a U-shaped or tear-shaped profile in cross-section. For instance, in FIG. 11C, a tear-shape profile is formed. This is indicated by a dashed line in FIG. 11C. The flexibility and size of the fins 368 may be adapted to this end.

In some examples, a height of the flexible fins 368 may be larger than a distance between adjacent fins 368 in cross-section. This may facilitate an alignment with the wind direction and may avoid flapping of the fins. In some examples, all the fins 368

In a further aspect, a method for mitigating vibrations in a parked wind turbine 10 is provided. The method, which is schematically illustrated in FIGS. 9A and 9B, may be particularly used during installation and/or during commissioning of the wind turbine. The method may also be used when the wind turbine is stopped after it has been operating (i.e. producing energy), e.g. during maintenance or repair.

The method comprises, at step 410 (see FIG. 9A), moving, e.g. sliding, a device 300 comprising a barrier 330 extending between a proximal support 310 and a distal support 320 around a wind turbine blade 22 and towards a root 210 of the blade 22 by pulling one or more, specifically two or more ropes 370 attached at or near, e.g. to, the proximal stiffening support 310. The device may be any device as described herein. A rope as used throughout the present disclosure for carrying a vibration mitigating device may be any suitable rope, cable, string, chain or similar elongated object suitable for carrying the device.

In some examples, the device 300 may be moved towards the blade root 210 until an internal surface of the distal stiffening support 320 touches a surface of the blade 22 and it gets stuck, and therefore cannot keep its movement towards the root 210. In some of these examples, if the device comprises an extended and a retracted position, the device 300 may be fully extended towards the root 210 once the distal stiffening support 320 gets stuck. In some other examples, the device 300 may be moved towards the blade root 210 until an internal surface of the proximal stiffening support 310 touches a surface of the blade 22 and it gets stuck, and therefore cannot keep its movement towards the root 210. Still in other examples, the device may be moved towards the blade root until the both the proximal 310 and distal 320 supports cannot continue their movement towards the blade root 310. In some examples, this may occur at a substantially same time. For example, the device may be configured such that, when its distal stiffening support 320 enters into contact with a local blade surface and gets stuck, the device has also achieved its maximum length and the proximal stiffening support also brushes against a local blade surface.

If a device 300 as described with respect to FIG. 4B is used, the device 300 may incorporate a sleeve 360 in some examples for facilitating the sliding around the blade 22. In these or other examples in which a sleeve is not used 360, an additional rope (not shown) may be attached to e.g. the distal stiffening support 320 for controlling the ascent of the device 300. If a device as described with respect to FIGS. 4A, 4C, 4D and 5 is used, a sleeve 360 may be used in some examples and the sleeve 360 may be dispensed with in other examples. In the latter examples, moving the device may be easier and faster.

In some examples the device 300 may be mounted to a wind turbine blade 22 in a rotor 18 already placed on top of the tower. In some of these examples, the ropes 370 may be lowered from a hub 20 or a nacelle 16 and then attached to the proximal stiffening support 310. The wind turbine blade 22 on which the device 300 is going to be arranged may be pointing downwards, i.e. it may substantially be at a six o'clock position. If the blade 22 is at a different position, the rotor 18 may be rotated to make the blade to point downwards. The device 300 may be mounted to a blade 22 at a different position, e.g. by using an additional rope attached to the distal stiffening support 320 to help to lift the device. But it may be easier and faster to install the device 300 with the blade 22 pointing downwards.

The device 300 may be also installed around a blade 22 which is yet to be attached to the wind turbine rotor 18. In these examples, a lifting device such as a crane may lift the blade such that the tip 220 is pointing downwards. The device 300 may then be moved, e.g. slid, around the blade upwardly by pulling the one or more ropes 370.

The method further comprises, at step 420 (see FIG. 9B), securing the device 300, e.g. to the wind turbine 10.

Securing may include attaching the one or more ropes 370, e.g two or more ropes, to the wind turbine. Attachment of the ropes may keep the device 300 in place and avoid that it falls down, e.g. by sliding towards a blade tip 220. In some examples, the ropes may be attached to a portion of the blade 22. For example, the blade 22 may include one or more anchor points to which the ropes may be attached. In other examples, the ropes may be attached to the hub 20 or the nacelle 16.

If the device 300 is mounted on an uninstalled blade 22, the method may further comprise installing the wind turbine blade 22. The blade 22 may be first attached to the hub 20 and the hub 20 and the blade 22 may be lifted together, or the hub 20 may be mounted up tower first and then the blade 22 with the device 300 may be lifted and connected to the hub 20.

Once a blade 22 installed up tower comprises a device 300, the rotor 18 may be rotated for mounting another device 300 on another blade 22 or for attaching another blade 22 with a mounted device 300.

Once a wind turbine 10 comprises one or more blades 22 with one or more devices 300 installed, the devices 300 may reduce wind turbine vibrations, e.g. vortex induced vibrations and/or stall induced vibrations.

The device 300 may stay mounted around the blade 22 until operation of the wind turbine is started or resumed. The method may further comprise removing the device 300 from the wind turbine blade 22 before starting or resuming operation. If more than one device 300 is installed, all of them may be removed before starting or resuming operation.

Removing a device 300 may comprise detaching the one or more ropes 370 and letting the device 300 fall by the action of gravity. The blade 22 may be pointing downwards, i.e. at a substantially six o'clock position. If the blade 22 is not in this position, the rotor 18 may be rotated to put the blade 22 pointing downwards. A device 300 may be used more than once in a same or a different wind turbine.

In a further aspect, a device 300 for mitigating vibrations of a parked wind turbine is provided. The device comprises a barrier 330 extending longitudinally between a first stiffening ring 310 and a second stiffening ring 320. The device is configured to surround a wind turbine blade 22 and to provide a gap 350 between the barrier 330 and the wind turbine blade 22.

The first 310 and second 320 stiffening ring may be the proximal and distal stiffening supports in any of FIGS. 4A, 4C, 4D, 5, 7 and 9A and 9B. The explanations provided with respect to FIGS. 4A-9B may be applicable to the structure, operation and installation/removal of the device of this aspect, except the ones relating to a device with a U- or C-shaped cross-section, as the device of the current aspect has a closed cross-section, e.g. a substantially circular or elliptical cross-section.

The device may have a shape of a truncated cone. In particular, the barrier 330 and the first 310 and second 320 stiffening rings may form a truncated (hollow) cone. The first stiffening ring may be larger than the second stiffening ring. For example, the first stiffening ring may have a larger diameter or major axis than the second stiffening ring.

In some examples, the device may comprise one or more additional stiffening rings 315 between the first and second stiffening rings. The rings may have a doughnut-like shape in some examples. An inside of the rings may be hollow in some examples. The rings may be inflatable in some of these examples. In other examples, a ring may comprise two connected sub-rings, e.g. an internal sub-ring and an external sub-ring connected along a radial direction.

In some examples, the barrier of the device may be permeable. I.e., the barrier may comprise a plurality of through holes, channels or pores. In some of these examples, the barrier may be a net.

In other examples, any of the devices 300 described herein, and in particular a device with a closed cross-section, may be installed and uninstalled using one or more drones. A drone may be connected to a device 300 in a retracted position by a rope. The drone may lift the device and cause the device to surround a wind turbine blade 22. The proximal stiffening support 310 may surround the wind turbine blade before than the distal stiffening support 320. The distal stiffening support 320 may get stuck around the blade 22 and the drone may cause the device to extend towards a root 210 of the blade 22. Once the device is fully extended and/or the proximal stiffening support 310 has gotten stuck too, the drone may carry the rope to a nacelle 16 or hub 18 to secure the device 300 to the blade 22.

This written description uses examples to disclose the present teaching, including the preferred embodiments, and also to enable any person skilled in the art to put the teaching into practice, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A device for mitigating vibrations of a parked wind turbine, comprising:
a proximal support configured to be arranged around a first portion of a wind turbine blade extending through the proximal support, a distal support configured to be arranged around a second portion of the wind turbine blade extending through the distal support, wherein the first portion of the wind turbine blade is at a different longitudinal position along the blade than the second portion;
a barrier extending between the proximal support and the distal support;
wherein the proximal and distal supports are configured to provide a gap between the barrier and a surface of the wind turbine blade such that the barrier is non-contacting relative to the wind turbine blade between the proximal and distal supports; and
the distal support comprising a shape and size to engage against the wind turbine blade at a desired position along the second portion of the wind turbine blade.

2. The device of claim 1, wherein the device comprises a circular or elliptical cross-section.

3. The device of claim 1, further comprising one or more additional supports between the proximal and distal supports, the additional supports spaced apart and also maintaining the barrier non-contacting relative to the wind turbine blade.

4. The device of claim 1, wherein the barrier comprises a plurality of pores.

5. The device of claim 4, wherein the barrier comprises a net.

6. The device of claim 4, wherein the plurality of pores represents between 20% and 70% of an external surface of the barrier.

7. The device of claim 1, further comprising a supporting sleeve configured to surround the wind turbine blade.

8. A device for mitigating vibrations of a parked wind turbine, comprising:
a proximal support configured to be arranged around a first portion of a wind turbine blade extending through the proximal support, a distal support configured to be arranged around a second portion of the wind turbine blade extending through the distal support, wherein the first portion of the wind turbine blade is at a different longitudinal position along the blade than the second portion;
a barrier extending between the proximal support and the distal support;
wherein the proximal and distal supports are configured to provide a gap between the barrier and a surface of the wind turbine blade such that the barrier is non-contacting relative to the wind turbine blade between the proximal and distal supports; and
wherein the device tapers from the proximal support towards the distal support.

9. A device for mitigating vibrations of a parked wind turbine, comprising:
a proximal support configured to be arranged around a first portion of a wind turbine blade, a distal support configured to be arranged around a second portion of the wind turbine blade, wherein the first portion of the wind turbine blade is at a different longitudinal position along the blade than the second portion;
a barrier extending between the proximal support and the distal support; and
wherein the proximal and distal supports are configured to provide a gap between the barrier and a surface of the wind turbine blade; and further comprising a plurality of flapping elements arranged at least partially around the barrier.

10. The device of claim 9, wherein the flapping elements are provided in a cover configured to at least partially wrapped around the barrier.

11. A device for mitigating vibrations of a parked wind turbine, comprising:
a proximal support configured to be arranged around a first portion of a wind turbine blade, a distal support configured to be arranged around a second portion of the wind turbine blade, wherein the first portion of the wind turbine blade is at a different longitudinal position along the blade than the second portion;
a barrier extending between the proximal support and the distal support; and
wherein the proximal and distal supports are configured to provide a gap between the barrier and a surface of the wind turbine blade; and
further comprising a plurality of fins arranged at least partially around the barrier.

12. The device of claim 11, wherein the fins are configured to follow a main direction of wind acting on the wind turbine.

13. A method for mitigating vibrations in a parked wind turbine, the method comprising:
moving a device having a barrier extending between a proximal support and a distal support around a wind turbine blade and towards a root of the blade by pulling one or more ropes attached at or near the proximal support;
securing the device on the wind turbine blade;
wherein the wind turbine blade extends through the proximal and distal supports and maintain the barrier non-contacting relative to the wind turbine blade between the proximal and distal supports; and
wherein the device is pulled by the ropes until the distal support engages against the wind turbine blade at a desired position along the wind turbine blade.

14. The method of claim 13, further comprising lowering the one or more ropes from a hub or a nacelle and attaching the ropes at or near the proximal support.

* * * * *